United States Patent [19]
Seaman et al.

[11] Patent Number: 5,846,434
[45] Date of Patent: Dec. 8, 1998

[54] IN-SITU GROUNDWATER REMEDIATION BY SELECTIVE COLLOID MOBILIZATION

[75] Inventors: John C. Seaman, New Ellenton; Paul M. Bertch, Aiken, both of S.C.

[73] Assignee: University of Georgia Research Foundation, Athens, Ga.

[21] Appl. No.: 808,253

[22] Filed: Feb. 28, 1997

Related U.S. Application Data

[60] Provisional application No. 60/012,654 Mar. 1, 1996.
[51] Int. Cl.⁶ .................................................. C02F 1/52
[52] U.S. Cl. ............................. 210/724; 210/727; 210/747
[58] Field of Search ....................................... 210/665, 712, 210/724, 725, 727, 729, 747, 754

[56] References Cited

U.S. PATENT DOCUMENTS

| | | | |
|---|---|---|---|
| 2,894,905 | 7/1959 | Bernard | 210/58 |
| 3,054,746 | 9/1962 | Gaden et al. | 210/44 |
| 3,106,525 | 10/1963 | Schmid et al. | 210/57 |
| 5,000,858 | 3/1991 | Manning et al. | 210/709 |
| 5,130,358 | 7/1992 | Danner | 524/140 |
| 5,152,903 | 10/1992 | Neff et al. | 210/734 |
| 5,263,795 | 11/1993 | Corey et al. | 405/128 |
| 5,275,739 | 1/1994 | Grant et al. | 210/682 |
| 5,303,871 | 4/1994 | Bateson et al. | 241/20 |
| 5,324,433 | 6/1994 | Grant et al. | 210/634 |
| 5,348,422 | 9/1994 | Manchak, III et al. | 405/128 |
| 5,370,800 | 12/1994 | Stevenson | 210/710 |
| 5,401,417 | 3/1995 | Dentel et al. | 210/674 |
| 5,401,418 | 3/1995 | Boyd | 210/691 |
| 5,405,509 | 4/1995 | Lomasney et al. | 204/130 |
| 5,407,583 | 4/1995 | Gill et al. | 210/701 |
| 5,409,614 | 4/1995 | Gallup et al. | 210/700 |
| 5,447,638 | 9/1995 | Holdar et al. | 210/728 |
| 5,458,437 | 10/1995 | Jaffe et al. | 405/128 |

OTHER PUBLICATIONS

Buddemeier, Robert W. and James R. Hunt, "Transport of Colloidal Contaminants in Groundwater; Radionuclide Migration at the Nevada Test Site," *Applied Geochemistry*, vol. 3, pp. 535–548, 1988.

McCarthy, John F. and Zachara, John M., "Subsurface Transport of Contaminants," *Environ. Sci. Technol.*, vol. 23 No. 5, pp. 496–502, 1989.

Penrose, William R., et al., "Mobility of Plutonium and Americium through a Shallow Aquifer in a Semiarid Region," *Environ. Sci. Technol.*, vol. 24, No. 2, pp. 288–234 (1990)

Kapan, Daniel, I., et al., "Application of Synchrotron X-ray Fluorscence Spectroscopy and Energy Dispersive X-ray Analysis to Identify Contaminant Metals on Groundwater Colloids," *Environ. Sci. Technol.*, vol. 28, No. 6, 1994.

Puls, Robert W. and Robert M. Powell, "Transport of Inorganic Colloids through Natural Aquifer Material: Implications for Contaminant Transport," *Environ Sci. Technol.*, vol. 26, No. 3, pp. 614–620, 1992.

Coston, Jennifer, A., et al., "$Pb^{2+}$ and $Zn^{2+}$ Adsorption by a Natural Aluminum–and Iron–Bearing Surface Coating on an Aquifer Sand," *Geochimica et Cosmochimica Acta.*, vol. 59, No. 17, pp. 3535–3547, 1995. .

(List continued on next page.)

*Primary Examiner*—Jay H. Woo
*Assistant Examiner*—Betsey J. Morrison

[57] ABSTRACT

An in-situ groundwater remediation pump and treat technique effective for reclamation of aquifers that have been contaminated with a mixed, metal-containing waste, which promotes selective mobilization of metal oxide colloids with a cationic surfactant, preferably a quaternary alkylammonium surfactant, without significantly reducing formation permeability that often accompanies large-scale colloid dispersion, thus increasing the efficiency of the remediation effort by enhancing the capture of strongly sorbing contaminants associated with the oxide phases. The resulting suspension can be separated from the bulk solution with controlled pH adjustments to destabilize the oxide colloids, and a clear supernatant which results that can be recycled through the injection well without further waste treatment.

21 Claims, 2 Drawing Sheets

OTHER PUBLICATIONS

Kinniburgh, D.G., et al., "Specific Adsorption of Trace Amounts of Calcium and Strontium by Hydrous Oxides of Iron and Aluminum," *Soil Sci. Soc. Amer. Proc.*, vol. 39, pp. 464–470, 1975.

Kinniburgh, D.G., et al., "Adsorption of Alkaline Earth, Transition, and Heavy Metal Cations by Hydrous Oxide Gels of Iron and Aluminum," *Soil. Sci. Soc. Am. J.*, vol. 40, pp. 796–799, 1976.

Zachara, John M., et al., "Chromate Adsorption on Amorphous Iron Oxyhydroxide in the Presence of Major Groundwater Ions," *Environ. Sci. Technol.*, vol. 21, No. 6, pp. 589–594, 1987.

Frenkel, H., et al., "Effects of Clay Type and Content, Exchangeable Sodium Percentage, and Electrolyte Concentration on Clay Dispersion and Soil Hydraulic Conductivity," *Soil. Sci. Soc. Am. J.*, vol. 42, pp. 32–39, 1978.

Goldberg, Sabine and Robert A. Glaubig, "Effect of Saturating Cation, pH, and Aluminum and Iron Oxide on the Flocculation of Kaolinite and Montmorillonite," *Clays and Clay Minerals*, vol. 35, No. 3, pp. 220–227, 1987.

Shainberg, I. et al., "Effect of Aluminum and Iron Oxides on Hydraulic Conductivity of Sandy Loam Soil," *Soil. Sci. Soc. Am. J.*, vol. 51, pp. 1283–1287, 1987.

Seaman, John C., et al., "Chemical Controls on Colloid Generation and Transport in a Sandy Aquifer," *Environ. Sci. Technol.*, vol. 29, No. 7, 1995.

Xu, Shihe and Stephen A. Boyd, "Cation Exchange Chemistry of Hexadecyltrimethylammonium in a Subsoil Containing Vermiculite," *Soil. Sci. Soc. Am. J.*, vol. 58, pp. 1382–1391, Sep.–Oct. 1994.

Xu, Shihe and Stephen A. Boyd, "Cationic Surfactant Sorption to a Vermicultic Subsoil via Hydrophobic Bonding," *Environ. Sci. Technol.*, vol. 29, No. 2, pp. 312–320, 1995.

IN-SITU GROUNDWATER REMEDIATION BY SELECTIVE COLLOID MOBILIZATION

STATEMENT OF GOVERNMENT INTEREST

This invention was made with government support under Grant No. DE-AC0976SR00-819 granted by the Department of Energy. The government has certain rights in this invention.

BACKGROUND OF THE INVENTION

This application claims benefit of USC Provisional Application No. 60/012,654, filed Mar. 1, 1994.

1. Field of the Invention

The present invention relates to a system for in-situ remediation of contaminated groundwater. In particular, the present invention relates to the removal of contaminants from groundwater through the selective mobilization of colloids with a cationic surfactant.

2. Prior Art

Decontaminating groundwater can be extremely difficult. In some cases of contaminated underground aquifers, remediation is so impractical that the only economical solution involves identifying and isolating the source of contamination, and then delaying human contact until natural diffusion of water through the aquifer can provide for dilution of the contaminant. In other cases, groundwater is treated with conventional ion exchange media, and/or charcoal absorber beds. Yet another option involves in-situ treatment in which chemicals are introduced which react with the ionic contaminants to form insoluble precipitates. While this method may remove the contaminants from solution and prevent them from leaching, the contaminants remain in the soil, albeit in stabilized form.

At present, the success of many in-situ aquifer remediation techniques is limited by the strong partitioning (i.e., precipitation, sorption, etc.) of groundwater contaminants to the immobile solid aquifer matrix. Many contaminants of greatest environmental concern, such as radionuclides, hydrophobic organics, and toxic metals, have high affinities for partitioning to solid phases. The slow release or irreversible nature of this partitioning can make it inefficient to reclaim an aquifer by simply capturing and treating the groundwater. Additionally, removal of trace level contaminants from low-level waste water to meet regulatory guidelines may be problematic. Dilute acidic wastes may require neutralization to precipitate hazardous metals, followed by addition of a flocculating agent to facilitate effective separation of the resulting dilute suspension from the bulk solution.

It is known that iron, manganese, and aluminum oxides play a major role in controlling the partitioning, and thus migration and availability or exposure hazard of many common groundwater contaminants; including radionuclides, metals, oxyanions such as arsenate, and hydrophobic organics. Therefore, the efficiency of most in-situ groundwater remediation strategies is limited by the reversibility and release kinetics for contaminants sorbed to these minerals. Chemical extractions, also known as "soil washing" have been proposed as potential intervention technologies for reclaiming metals from contaminated soils and aquifers. Typically, these extracts consist of dilute acids or chelates specifically targeted at removing contaminants associated with specific solid phases, such as iron and manganese oxides. However, the effectiveness of such techniques is limited and they tend to be prohibitively expensive.

Colloid mobilization as a potential remediation strategy has been previously recognized in Manipulation of Groundwater Colloids For Environmental Restoration, (McCarthy and Wobber ed. 1993; Lewis Publishers, Ann Arbor, Mich.). While it is known that anionic surfactants or dispersing agents can be used to stabilize colloidal suspensions, the use of cationic surfactants has been discouraged. It has been presumed that dilute solutions of cationic surfactants would act as flocculating agents, thus reducing the mobility of groundwater colloids rather than inducing dispersion. However, the use of strong anionic dispersants such as polyphosphates and alkaline sodium solutions on sandy subsurface aquifers typical of highly weathered sediments induces massive non-selective dispersion of the aquifer clays, and thereby reduces aquifer permeability. Once the hydraulic conductivity of a given aquifer has been reduced, the efficacy of any in-situ remediation technique is compromised.

U.S. Pat. No. 5,130,358 discloses hydrophilic cationic polymer composites for use as flocculating agents, for flotation of minerals, or for recovery of oil waste in aqueous systems. The subject polymers preferably comprise amino or quaternary ammonium groups.

U.S. Pat. No. 5,324,433 to Grant, et al. discloses a remediation strategy for removing "soluble" heavy metal contaminants by applying soluble ionic species to compete with contaminants for exchange sites present on clay minerals. Removal of the metals is achieved through the application of ionic species that actually compete with the target contaminants for these exchange sites, thus increasing contaminant mobility by enhancing its partitioning to the solution (i.e. mobile) phase that may be easily captured by pumping for subsequent treatment.

U.S. Pat. No. 5,401,418 to Boyd describes the use of tetra quaternary ammonium compounds to modify the sorption properties of smectite clay for use as reactive barriers so that they readily sorb hydrophobic organics.

U.S. Pat. No. 5,447,638 to Holder, et al. discloses the use of quaternary ammonium surfactants as flocculating agents for particles dispersed in non-polar solvents.

In summary, known means of groundwater remediation are ineffective, prohibitively expensive, and/or inefficient. The known methods which utilize colloid mobilization are unsatisfactory due, in part, to their non-selective mobilization of aquifer colloids and the consequent reduction in aquifer permeability.

SUMMARY OF THE INVENTION

The invention provides a process for in situ remediation of a contaminated aqueous solution, such as groundwater, that does not significantly reduce hydraulic conductivity thereof. The term "aqueous solution" as used herein is meant to include solutions in which the solvent is typically water and optionally, water-miscible liquids. In this process a cationic surfactant is introduced to the groundwater, resulting in the selective mobilization of the metal oxides contained therein. The suspension is then flocculated, preferably by pH adjustment, and the precipitated contaminants can then be separated from the solution.

In the preferred embodiment, the invention comprises two well systems spaced apart, one system injecting a fluid into an aquifer, the other system extracting a fluid. The fluid contains a cationic surfactant and is preferably a liquid, liquid mixture, or a liquid carried by a gas. The injecting well system is preferably upgradient from the zone of the aquifer to be remediated, while the extracting well system is downgradient from the contaminated zone of the aquifer. The injecting well system is connected to a source of fluid for injecting and a pump. The extracting well is connected to a system for capturing groundwater and inducing flocculation, such as a holding tank or reaction column.

The method and apparatus of the invention, using a cationic surfactant such as a quaternary alkylammonium surfactant, thus selectively mobilizes the metal oxide colloids in the groundwater without significantly reducing groundwater permeability.

It is, therefore, one object of the present invention to provide a method for the in situ remediation of contaminated groundwater which is fast, efficient, and highly effective in reducing the level of contaminants to environmentally acceptable limits.

It is another object to provide an in situ remediation method that increases the mobility of the sorbing phase and permits recovery from capture wells which significantly enhances both the efficiency of the remediation effort and simplifies the waste-water treatment process.

It is a further object of the present invention to provide a method of selective colloid mobilization to remediate contaminated groundwater without significantly reducing aquifer permeability in the process.

These objects and other objects, features and advantages of the present invention will become readily apparent to those skilled in the art from the following detailed description, in which is shown and described the preferred embodiment of the invention, simply by way of illustration of the best mode contemplated of carrying out the invention. As will be realized, the invention is capable of other and different embodiments and its several details are capable of modifications in various obvious respects, all without departing from the invention. Accordingly, the drawing and description are to be regarded as illustrative in nature, and not as restrictive.

DETAILED DESCRIPTION OF THE INVENTION

Figure 1:
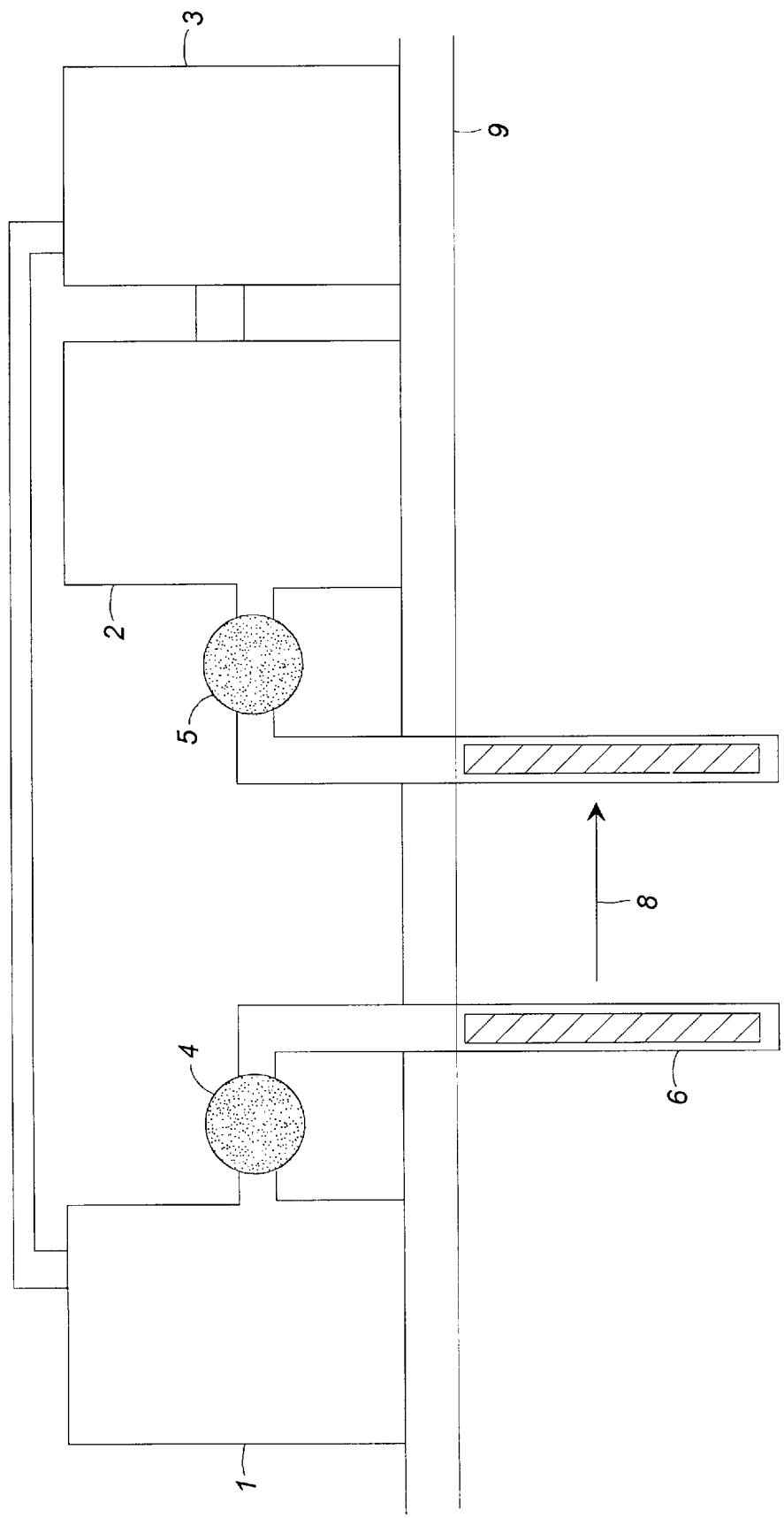
FIG. 1 is a schematic representation of the apparatus and method used to carry out the present invention.

The present invention provides a method of aqueous solution remediation by selectively mobilizing metal oxides in colloidal form having a net-positive surface charge in the aqueous solution which comprises the metal oxide colloids and other polyvalent anionic solids by (a) adding a cationic surfactant to the aqueous solution, thereby shielding said metal oxide colloids from at least a portion of the negatively charged sites associated with said polyvalent anionic solids (i.e., phyllosilicate clays) present in the aqueous solution, resulting in a suspension of the metal oxides in the aqueous solution; (b) flocculating the resulting suspension, resulting in a sediment precipitate of metal oxides and a supernatant liquid; and (c) separating the resulting precipitate from the supernatant liquid, resulting in the removal of the precipitate and the remediation of the aqueous solution.

The described process relies on the novel ability to selectively mobilize iron, aluminum, manganese, and other metal oxides at levels that will increase the capture of oxide-bound contaminants without significantly reducing the permeability of the aquifer that often accompanies large-scale colloid dispersion. In the current invention, significant quantities of groundwater colloids are mobilized by the introduction of dilute solutions, preferably ≈0.001M, of cationic surfactants, preferably a quaternary alkylammonium surfactant such as hexadecyltrimethylammonium bromide (HDTMA), without adversely affecting aquifer permeability. The resulting oxide suspensions generated using cationic surfactants are stable and will not significantly settle after several days.

The HDTMA mobilizes the metal oxides without significantly reducing the hydraulic permeability of the aquifer by reducing and shielding the negative charge present on other clay minerals. Initial sorption of the HDTMA is at the cation exchange sites, but at higher surface loadings, surfactant partitioning into this hydrophobic layer of sorbed HDTMA exceeds the cation exchange capacity of the clay and imparts a net-positive charge to the clay surface. The ability to induce charge reversal typically increases with increasing charge density of the clay sorbent. Thus, high charge clays, such as smectites, tend to readily sorb excess quantities of the surfactant and develop a positive surface charge.

Once the suspension has been extracted from the subsurface via the capture well, flocculation of the extracted suspension preferably is induced by adjusting the pH to neutrality. The adjustment of the pH to neutrality reduces the positive surface charge and also increases net sorption by the iron oxide suspension of any soluble metal species that were with the mobilized suspension. After settling, a clear solution results containing the original surfactant and can be recycled for use as the treatment solution.

In the preferred embodiment of the process of the invention, the dilute cationic surfactant is delivered to the geologic zone of interest using an injection well and a capture well that is located some distance downgradient. Pumping of the capture well is preferably initiated at a similar rate to that of the treatment solution injection. The pumps drive the fluid through the injection well system, across the contaminated aquifer so that the metal oxide colloids contained therein are selectively mobilized. The fluid bearing the mobilized colloids then flows into the extraction well system, where the fluid is pumped to the surface and the mobilized colloids are separated from the fluid by sedimentation induced by pH adjustment. The precipitated contaminants can be treated or disposed of in one of a variety of ways known in the art to minimize their health and environmental dangers. The supernatant solution containing the cationic surfactant can be recycled back into the groundwater through the injection well to enhance further colloid mobilization.

The invention also provides an apparatus for in-situ groundwater remediation comprising: (a) means for injecting a cationic surfactant to the groundwater; (b) means for capturing groundwater containing the cationic surfactant; (c) means for flocculating the captured groundwater to settle colloids, resulting in a precipitate of metal oxides and a supernatant liquid; and (d) means for returning the now remediated supernatant liquid to the groundwater.

Referring to FIG. 1, the preferred embodiment of the apparatus of the invention is a field scale system is comprised of an injection solution reservoir 1, a post-capture treatment tank 2, a sedimentation tank 3, at least one injection well 6, and at least one capture well 7. Arrow 8 indicates the direction of groundwater flow and dotted-line 9 indicates the water table. Injection solution resevoir 1, associated with the injection well 6, is for mixing, storing, and monitoring the concentration of the surfactant injection solution. The injection solution is delivered to the injection well 6 screened within the contaminated aquifer via a controlled metering system 4 (i.e. pumps and flow controls).

At the same time, groundwater is collected down-gradient 8 from the injection well 6 to capture pump 5 at capture well 7 and stored initially in the post-capture treatment tank 2. A sampling valve (not shown) is preferably provided in the feed line to post-capture treatment tank 2 so that groundwater samples may be collected for chemical analysis prior to any post-collection treatment. Within post-capture treatment tank 2, the pH of the collected groundwater suspension is continuously adjusted to neutrality (pH ≈7–8) by the addition of dilute alkaline solutions, preferably alkaline or alkaline-earth hydroxides such as, for example, NaOH, $Ca(OH)_2$ or KOH. Any additional reactants required to ensure precipitation of solution phase contaminants would also be added in post-capture treatment tank 2 depending on the exact nature of the contaminated groundwater.

The neutral suspension then is delivered to the sedimentation tank 3 which functions as a settling and storage chamber. After the suspension has settled, the clear solution containing the surfactant is recirculated to injection solution reservoir 1 for reinjection into the contaminated aquifer through injection well 6. Prior to transfer of the reclaimed solution to the injection solution reservoir 1, chemical analysis of the clear solution can be performed to confirm the effectiveness of the post-capture treatment process. Additional reaction chambers may be added depending on the exact nature of the reclamation project.

The steps of this process are preferably continued/repeated as necessary to remediate the groundwater. The captured groundwater is monitored to determine the level of remaining contamination. The determination as to what level of contamination constitutes remediated groundwater are made with consideration of the balance of the acceptability of some contamination in the remediated groundwater versus the additional cost of removal of the remaining contaminants. The level of contamination acceptable in the remediated groundwater may be set by federal, state or local ordinance or regulations, or the specific needs of that area.

Additionally, once reclamation has been completed, the aquifer can be leached with a dilute (≈0.01M) salt solution that will stabilize the remaining kaolinite, and other polyvalent anionic solids (i.e., phyllosilicate clays), and facilitate the removal of the remaining surfactant. Calcium salts, such as $CaCl_2$ and $CaSO_4$, are preferred as the salt solution because they are highly effective at flocculating aluminosilicate clays (e.g., smectite, kaolinite, etc.) and generally are more competitive than other groundwater species such as $Na^+$, $K^+$, and $Mg^{+2}$ for the cation exchange sites occupied by HDTMA. The use of sodium containing solutions is discouraged because it is expected that the residual clays would be highly dispersive after the reclamation method has removed a significant fraction of the iron oxides that act as stabilizing agents within these formations.

The surfactant may be removed by circulating the salt solution through the aquifer between the injection well 6 and capture well 7 to stabilize the remaining clay minerals within the formation against dispersion and remove residual surfactant adsorbed to clay surfaces through cation exchange. Using calcium salts, for example, the surfactant adsorbed to the clay surfaces would be removed through cation exchange with $Ca^{+2}$.

While HDTMA is the preferred injection solution, other cationic surfactants, such as trimethylphenylammonium (TMPA), tetramethylammonium (TMA), tetraethylammonium (TEA), tetradecyltrimethylammonium (TDTMA), benzyltrimethylammonium (BTMA), benzyltriethylammonium (BTEA), and benzyldimethyltetradecylamonium (BDTDA), and their salts, may be employed. All of the halide salt forms (Cl, Br, I, etc.) of the cationic surfactants should be effective as the injection solution. However, salts composed of polyvalent anions, if available, would be less effective because of the flocculating ability of the polyvalent anion for the dispersed positively-charged iron oxides.

In the selection of the appropriate cationic surfactant, a primary concern is formation clogging due to particle capture in pore constrictions which limit the remediation efforts. In choosing a surfactant, some additional factors to consider are: (1) the extent of adsorption of the surfactant to the aquifer matrix; (2) the fate of the residual surfactant; (3) the degradability of the surfactant; (4) the health risks associated with the surfactant; (5) the cost and availability of the surfactant; and (6) regulatory concerns associated with a particular surfactant formulation. Evaluation of these concerns by one of ordinary skill in the art will determine which surfactant offers the greatest potential for use in the field and may be done without undue experimentation. Quaternary alkylammonium surfactants provide the best balance of these concerns.

While the process of the present invention can be used in a variety of environments, the method is particularly well-suited for use in aquifers containing highly weathered sediments, typical of the Upper Coastal Plain of the southeastern United States, a geographic region extending from Mississippi to New Jersey. In these aquifers, organic carbon content is very low and the sediments are coarse-textured and oxide-coated. The mineralogy of clay typically found in such areas consists primarily of kaolinite, geothite, and mica (illite). Similar sediments are found in Central and South America, Australia, China, and other regions in Asia and the Far East.

The invention is further illustrated by the following examples which are not intended to be limiting.

EXAMPLE 1

Column experiments were performed in 10 cm and 30 cm long plexiglass tubes with an interior diameter of 5 cm. Field moist sample from the Barnwell aquifer was packed in columns to a uniform bulk density of ≈1.5 g $cm^{-3}$. A given repacked column was used for only one leaching treatment before the matrix was replaced with fresh material. Acid washed coarse (>500 μm) sand layers (1 cm in depth) were placed above and below the sample to reduce the potential for colloid generation by turbulent flow and distribute flow. The columns were oriented vertically and slowly saturated from the outlet with deionized water (<0.25 mL $min^{-1}$).

After saturation, the columns were turned horizontally and flow was initiated at a constant rate of 1 mL $min^{-1}$ (Darcy velocity of ≈0.72 m $d^{-1}$) with deionized water for <0.20 pore volumes prior to the initiation of the fluid treatment. The EC, pH and turbidity (NTU) of the effluent were monitored continuously, and leachate fractions were collected for analysis of solution cations by atomic absorption spectrometry. The pressure head was measured at the inlet of the column as an indicator of hydraulic conductivity (K) and column plugging. An 0-1 PSI pressure transducer was attached to the column inlet and the output voltage was calibrated using a water column that was open to the atmosphere at the inlet of the column.

Treatments consisted of leaching the column for a prescribed number of pore volumes, in most cases 10, with a treatment solution followed by leaching with DIW (deionized water) to simulate dilution within the aquifer from low ionic strength native groundwater. All trends with respect to effluent chemistry and colloid generation were confirmed with at least two treatment replications using fresh matrix material.

No significant effluent turbidity (<1 NTU) was observed for columns leached exclusively with DIW, indicating that colloid generation was controlled by solution chemistry and not an artifact of the disruptive influence of sampling and column packing.

EXAMPLE 2

The operability of this invention has been demonstrated in tests conducted with sediments from the Tobacco Road and Barnwell/McBean Formation located on the upper coastal plain in Aiken, S.C. The HDTMA treatment solution was injected into the Tobacco Road and Barnwell/McBean sediments, which consist mainly of deep red, fine to coarse sands and clayey sands with interbeds of clay, sandy clay, and gravel. Elevated levels of effluent turbidity were observed during the injection of the cationic surfactant, in excess of 1,000 nephelometric turbidity units (NTU), without an observed increase in hydraulic head associated with column plugging. In contrast, columns leached with a Na-polyphosphate solution, a nonselective dispersing agent, at equivalent injection rates displayed a steady increase in hydraulic head throughout the course of leaching that was indicative of column plugging due to large-scale, nonselective dispersion of both oxides and aluminosilicate clays present within the column.

The cationic surfactant appears to have both increased net-positive surface charge on mobile iron oxide colloids and blocked cation exchange sites that could potentially result in the capture of these particles during transport, but did not increase the mobility of phyllosilicates at low surface coverages. Aluminum exchange and hydrolysis reactions promoted by the cationic surfactant lowered the solution pH and increased positive surface charge on variable charge minerals such as iron oxides. Additionally, adsorption of the surfactant at cation exchange sites effectively inhibited their ability to induce flocculation without increasing the colloidal mobility of these clay minerals (phyllosilicates such as mica, kaolinite, and HIV), thereby reducing the attraction for each other. In essence, HDTMA increased the positive charge character and the zero point of net charge (ZPNC) for the formation so that submicron Fe oxides became readily mobile.

Figure 2A:
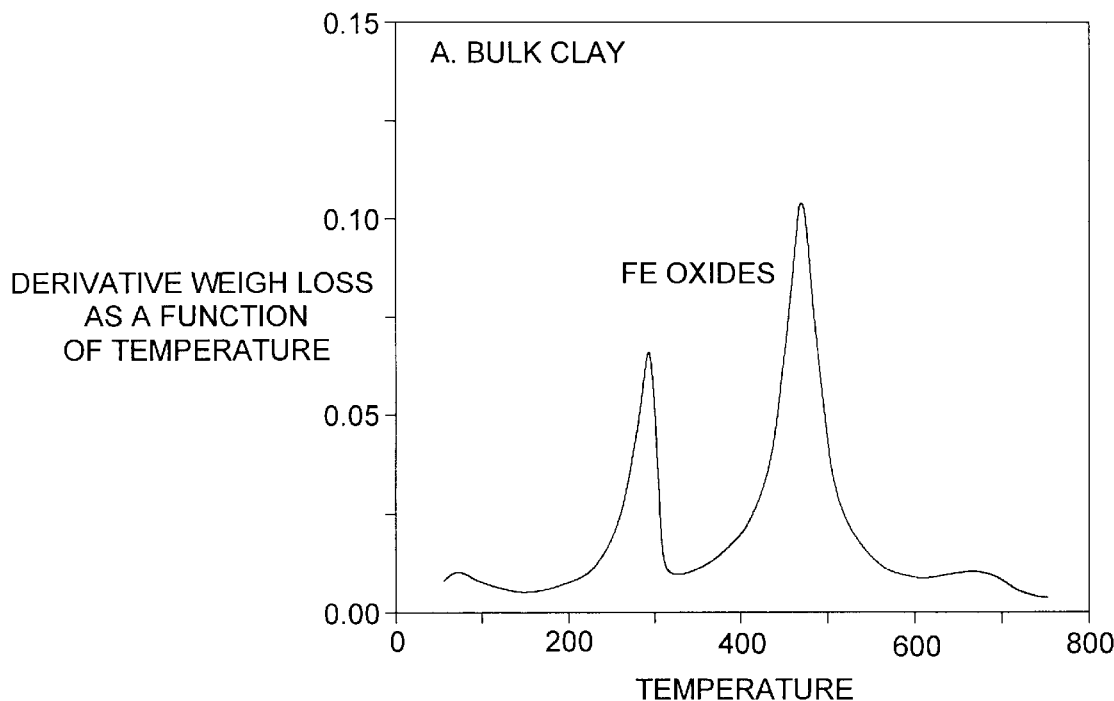
FIG. 2a is a representation of thermo-gravimetric analysis (TGA) patterns for bulk clay.
Figure 2B:
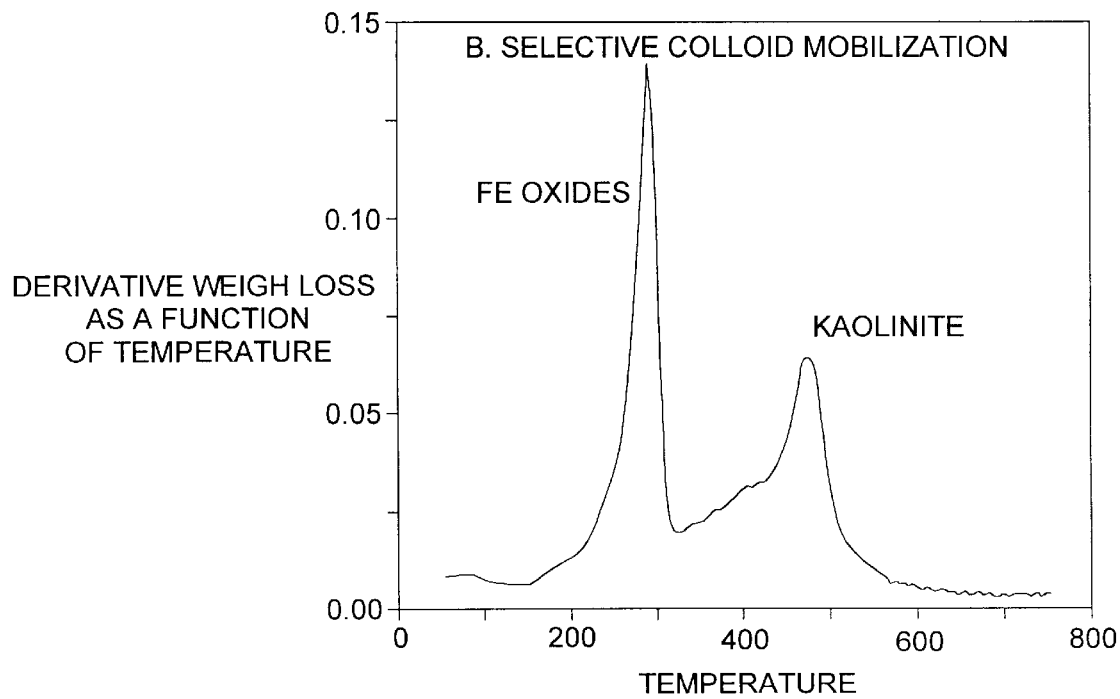
FIG. 2b is a representation of thermo-gravimetric analysis (TGA) for colloids mobilized using the method of this invention.

FIG. 2 shows the thermogravimetric analysis (TGA) patterns for the bulk clay and colloids mobilized. When heated, geothite (Fe oxyhydroxide) and kaolinite (1:1 layer phyllosilicate clay), the two predominate clay minerals in the aquifer sediments, display characteristic weight losses at $\approx 250°-350°$ C. and $450°-500°$ C., respectively, with the area of the derivative peaks being indicative of the relative quantity of these two minerals. Based on the TGA patterns, the treated material (FIG. 2b) is enriched in iron oxides compared to the bulk clay suspension from the sediments (FIG. 2a). TGA patterns for column suspensions generated by injection of the Na-polyphosphate solution, the nonselective dispersing agent, were essentially identical to that of the bulk clay (i.e., FIG. 2a).

This in-situ remediation method can be applied to any number of contaminated sites, including, for example, aquifers proximate to radioactive waste or chemical waste burial sites. It is very cost effective and more efficient than other in situ methods currently available.

The specific cationic surfactant can be selected for remediation of a specific mineral type. One skilled in the art can develop predictive models based on the chemical structure of the surfactant (i.e., alkyl chain lengths and aromatic alkyl substitutions) without undue experimentation.

Although the present invention has been described with respect to particular embodiments, it will be apparent to those skilled in the art that modifications to the method of the present invention can be made which are within the scope and spirit of the present invention and its equivalents.

What is claimed is:

1. A method of aqueous solution remediation by selectively mobilizing metal oxides in colloidal form having a net-positive surface charge in the aqueous solution which comprises metal oxide colloids and phyllosilicate clays, comprising the steps of:

(a) adding a cationic surfactant to the aqueous solution, thereby shielding said metal oxide colloids from at least a portion of the negatively charged sites associated with said phyllosilicate clays present in the aqueous solution, resulting in a stable suspension of the metal oxides in the aqueous solution;

(b) flocculating the resulting suspension, resulting in a sediment of metal oxides and a supernatant liquid; and (c) separating the resulting sediment from the supernatant liquid, resulting in the removal of the sediment and the remediation of the aqueous solution.

2. A method as claimed in claim 1, further comprising the step of returning said supernatant liquid to the aqueous solution.

3. A method as claimed in claim 1, wherein the cationic surfactant is selected from the group consisting of quaternary alkylammoniums and salts of quaternary alkylammoniums.

4. A method as claimed in claim 3, wherein the cationic surfactant is selected from the group consisting of trimethylphenylammonium, tetramethylammonium, tetraethylammonium, tetradecyltrimethylammonium, benzyltrimethylammonium, benzyltrimethylammonium, benzyldimethyltetradecylamonium, and salts thereof.

5. A method as claimed in claim 3, wherein the metal oxides are selected from the group consisting of iron oxides, aluminum oxides, and manganese oxides.

6. A method as claimed in claim 1, wherein the step of flocculating comprises modifying the pH of the aqueous solution to between about 7 and 8.

7. A method as claimed in claim 6, wherein the step of modifying the pH comprises adding an alkaline or alkaline earth hydroxide to the aqueous solution.

8. A method as claimed in claim 7, wherein the metal hydroxide is selected from the group consisting of sodium hydroxide, calcium hydroxide and potassium hydroxide.

9. A method as claimed in claim 1, wherein the aqueous solution is groundwater.

10. A method for in-situ remediation of groundwater by selectively mobilizing metal oxides in colloidal form having a net positive surface charge in the groundwater which comprises the metal oxide colloids and phyllosilicate clays, comprising the steps of:

(a) injecting a cationic surfactant to the groundwater;

(b) capturing groundwater containing the cationic surfactant;

(c) flocculating the captured groundwater to settle colloids, resulting in a precipitate of metal oxides and a supernatant liquid; and (d) returning the now remediated supernatant liquid to the groundwater.

11. A method as claimed in claim 10 further comprising the step of repeating steps (a) through (d) a number of times sufficient to remediate the groundwater.

12. A method as claimed in claim 10, wherein said step of injecting occurs at a position upgradient from said groundwater sought to be remediated.

13. A method as claimed in claim 12, wherein said step of extracting occurs at a position downgradient from said groundwater sought to be remediated.

14. A method as claimed in claim 10, further comprising the step of stabilizing any remaining polyvalent anionic solids in the groundwater.

15. A method as claimed in claim 14, wherein the step of stabilizing comprises leaching the groundwater with calcium chloride.

16. A method as claimed in claim 10, further comprising the step of removing the cationic surfactant from the groundwater.

17. A method as claimed in claim 10, wherein the cationic surfactant is selected from the group consisting of quaternary alkylammoniums and salts of quaternary alkylammoniums.

18. A method as claimed in claim 17, wherein the cationic surfactant is selected from the group consisting of trimethylphenylammonium, tetramethylammonium, tetraethylammonium, tetradecyltrimethylammonium, benzyltrimethylammonium, benzyltrimethylammonium, benzyldimethyltetradecylamonium, and salts thereof.

19. A method as claimed in claim 10, wherein the step of flocculating is comprised of modifying the pH of the groundwater to between 7 and 8.

20. A method as claimed in claim 19, wherein the step of modifying the pH comprises adding a metal hydroxide to the ground water.

21. A method as claimed in claim 20, wherein the metal hydroxide is selected from the group consisting of sodium hydroxide, calcium hydroxide and potassium hydroxide.

\* \* \* \* \*